US012755019B2

(12) United States Patent
Jabbar et al.

(10) Patent No.: US 12,755,019 B2
(45) Date of Patent: Oct. 6, 2026

(54) METHODS TO ENSURE TRUST VALIDATION AND INTEGRITY OF WORKFLOW EXECUTION

(71) Applicant: Dell Products L.P., Round Rock, TX (US)

(72) Inventors: Ameer M. Jabbar, Lilburn, GA (US); Yidong Wang, Weston, MA (US); Qi Jin, West Newton, MA (US); Ching-Yun Chao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 105 days.

(21) Appl. No.: 18/466,907

(22) Filed: Sep. 14, 2023

(65) Prior Publication Data

US 2025/0094590 A1 Mar. 20, 2025

(51) Int. Cl.
*G06F 21/57* (2013.01)
*H04L 9/32* (2006.01)

(52) U.S. Cl.
CPC ............ *G06F 21/57* (2013.01); *H04L 9/3247* (2013.01); *H04L 9/3263* (2013.01)

(58) Field of Classification Search
CPC ...... G06F 21/57; H04L 9/3247; H04L 9/3263
See application file for complete search history.

(56) References Cited

U.S. PATENT DOCUMENTS 8,964,990 B1 * 2/2015 Baer ....................... H04L 63/06 380/279
10,891,569 B1 1/2021 Werner
11,334,471 B1 * 5/2022 Stocker ............... G06F 11/3688
11,356,273 B1 * 6/2022 Patel ........................ H04L 9/088
11,818,115 B1 * 11/2023 Shah ................... G06F 21/6245
11,995,467 B1 * 5/2024 Goacher ................. G06F 9/547
2006/0149698 A1 * 7/2006 Haselden ........... G06Q 10/0633
2008/0216147 A1 * 9/2008 Duffy ..................... G06Q 10/10 726/1
2011/0209159 A1 8/2011 Baratz et al.
2014/0123312 A1 5/2014 Marcotte
2016/0182525 A1 6/2016 Zhu et al.
2017/0041296 A1 * 2/2017 Ford ....................... G06F 21/64
2018/0062918 A1 * 3/2018 Celikyilmaz ........... H04L 67/60
2019/0199705 A1 * 6/2019 Zhu ....................... H04L 63/083
2019/0392392 A1 12/2019 Elden et al.
2020/0151630 A1 * 5/2020 Shakhnovich ....... G06Q 10/063
2020/0162237 A1 5/2020 Chauhan et al.
2020/0351090 A1 11/2020 Gardner (Continued)

OTHER PUBLICATIONS

Rose et al., Zero Trust Architecture, Aug. 1, 2020, NIST Special Publication, 800-207.

*Primary Examiner* — Philip J Chea
*Assistant Examiner* — Ghizlane Maazouz
(74) *Attorney, Agent, or Firm* — Workman Nydegger

(57) ABSTRACT

One example method includes receiving, at a multi cloud service orchestration platform from a client, a request for performance of a workflow, authenticating and authorizing the client, invoking orchestration of the workflow, invoking the workflow, validating a workflow definition associated with the workflow, and on successful validation, initializing execution of the workflow, and executing, at an activity container, the workflow. The method may be performed in the multi cloud service orchestration platform.

12 Claims, 2 Drawing Sheets

(56) References Cited

U.S. PATENT DOCUMENTS

| | | | |
|---|---|---|---|
| 2020/0409940 | A1 | 12/2020 | Gu et al. |
| 2021/0103649 | A1 | 4/2021 | Korus et al. |
| 2022/0027806 | A1* | 1/2022 | Burman ........... G06Q 10/06316 |
| 2022/0070246 | A1* | 3/2022 | Ripa ........................ H04L 67/06 |
| 2022/0292167 | A1 | 9/2022 | Vaishnav et al. |
| 2023/0353575 | A1* | 11/2023 | Chandra ................. H04L 63/08 |
| 2024/0370294 | A1* | 11/2024 | Kumar .................. G06F 9/4881 |
| 2025/0106221 | A1 | 3/2025 | Wang et al. |

* cited by examiner

METHODS TO ENSURE TRUST VALIDATION AND INTEGRITY OF WORKFLOW EXECUTION

FIELD OF THE INVENTION

Embodiments of the present invention generally relate to the integrity of multi-cloud service orchestration platforms. More particularly, at least some embodiments of the invention relate to systems, hardware, software, computer-readable media, and methods, for implementing trust validation and workflow execution integrity in multi-cloud environments.

BACKGROUND

A workflow subsystem is an important building block of a multi-cloud service orchestration platform. In general, new services are onboarded to the platform through declarative and intent driven user interfaces, leveraging the workflow subsystem. A simple example of an onboarding script for a new service may be as follows:

```
POST /rest/v1/orchestrations
    {
    "subscription": "my-subscription",
    "offer": "multi cloud storage",
    "workflow": "create-storage-in-aws",
    "parameters": { . . . }
    }
```

In this illustrative example, the requested service, or workflow, is the creation, or allocation, of storage in the Amazon Web Services (AWS) platform. A significant problem that arises however is how to protect and maintain the integrity of the platform runtime to run workflow definitions, and workflow implementations, which may be provided to the platform both by internal developers and by third party vendor developers.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
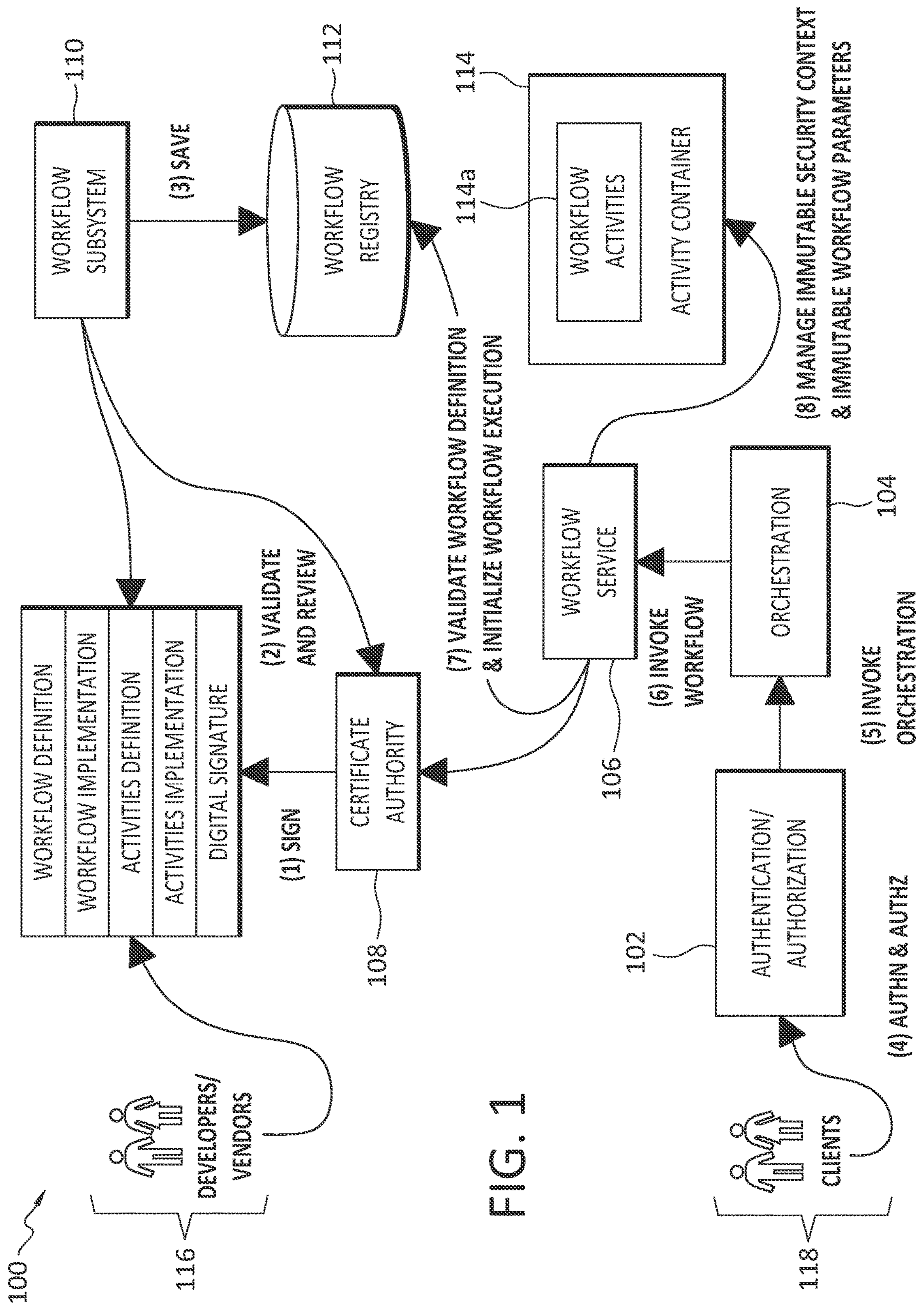
FIG. 1 discloses aspects of an example architecture, and associated method, according to an example embodiment of the invention.

Embodiments of the present invention generally relate to the integrity of multi-cloud service orchestration platforms. More particularly, at least some embodiments of the invention relate to systems, hardware, software, computer-readable media, and methods, for implementing trust validation and workflow execution integrity in multi-cloud environments.

One example embodiment of the invention comprises a secure workflow execution environment implemented in a multi cloud orchestration platform, or simply 'platform' herein, and based on zero trust principles. That is, no implicit trust is granted to workflows on the platform. Rather, workflow definitions/implementations, workflow parameters, and activity definitions, whether any/all of these are provided by internal developers or third parties, must be signed by a trusted certificate authority, which may be hosted on the platform.

When a client, for example, requests a workflow to be performed, the client may have to pass an authentication/authorization process, upon the successful completion of which, orchestration of the workflow may be requested, and the workflow invoked. A workflow service may communicate with a certificate authority to validate the workflow definition, and upon successful validation, the validated workflow may be stored in a registry. The validated workflow may then be initialized by the workflow service, and may be executed in an activities execution container that may make available, to the executing workflow and workflow activities, validated workflow parameters, which may be read-only, relating to the workflow. In an embodiment, the validated workflow parameters, and a client security context, cannot be modified by the activities execution container while the workflow is running. This may help to ensure integrity of the workflow and workflow parameters, while also avoiding interruption of the workflow which might otherwise occur if the security context and workflow parameters were not immutable.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that the embodiment may operate to maintain the security and integrity of a platform, such as a multi cloud platform for example, that receives requests to run third party workflows. An embodiment of the invention may maintain the security and integrity of the platform throughout the time that the requested workflow is running. An embodiment may prevent changes to a client security context or workflow while that workflow is running. An embodiment may validate a client and workflow in advance so as to avoid potential problems that might otherwise occur during the running of an unvalidated workflow. Various other advantages of one or more embodiments of the invention will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Operating Environment

The following is a discussion of aspects of example operating environments for various embodiments of the invention. This discussion is not intended to limit the scope of the invention, or the applicability of the embodiments, in any way.

In general, embodiments of the invention may be implemented in connection with cloud computing environments which may include, but are not limited to, multi cloud computing environments. Example cloud computing environments, which may or may not be public, include storage environments that may provide data protection functionality for one or more clients. Another example of a cloud computing environment is one in which data processing, data protection, and other, services may be performed on behalf of one or more clients. These services may be implemented for example, by way of one or more containerized applications. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment. Finally, one or more clients, which may be internal or external to the cloud computing environment, may communicate with the cloud computing environment to request the performance of various workflows by the cloud computing environment.

B. Detailed Description of an Example Embodiment of the Invention

B.1 Overview

An example embodiment of the invention comprises a secure workflow execution runtime that may be built using the Zero Trust Principles. That is, there is no implicit trust granted to workflows on the platform. Rather, in an embodiment of the invention, workflow definitions and activity definitions must be validated and signed by a trusted certificate authority, which may be hosted on the platform. The multi cloud orchestration platform, which may also be referred to herein simply as the 'platform,' may verify integrity of workflow and activity definition before execution of the workflow by/on the platform.

In general, workflow parameters provided by a client or other user may first be validated, and then digitally signed, by the platform. The parameters may be managed by a workflow activity execution container, hosted at the platform, and be read-only to activity code, that is, to the workflow that is running in the activity execution container. In this way, the workflow is not able to modify the workflow parameters, at least while the workflow is running. Finally, a client security context may be managed by a security service of the platform, and made available, by way of the activity execution container, to the activity code, that is, the workflow, as immutable data. Further information concerning the definition, implementation, and use, of example embodiments of a client security context are disclosed in U.S. patent application Ser. No. 18/486,713 filed Oct. 13, 2023, entitled "RENDER HIGH WORKFLOW EXECUTION RELIABILITY USING IMMUTABLE SECURITY CONTEXT," which is incorporated herein in its entirety by this reference.

The discussion of an example embodiment herein may reference various terms. These include "workflow definition" (referring to a source for an instance of a workflow execution), "activity" (a normal function or method that executes a single, well-defined, short or long running action, and "workflow" or "workflow code" (orchestrates the execution of activities, persisting the results. The following examples are provided for purposes of illustration and are not intended to limit the scope of the invention in any way.

1. Workflow implementation example:
```
public class OrderFulfillmentWorkflowImpl implements
OrderFulfillmentWorkflow {
//..................
@Override
public void createOrder(OrderDTO orderDTO) {
paymentActivity.debitPayment(orderDTO);
reserveInventoryActivity.reserveInventory(orderDTO);
shipGoodsActivity.shipGoods(orderDTO);
orderActivity.completeOrder(orderDTO);
}
}
```
2. Workflow activity definition example:
```
@ActivityInterface
public interface DebitPaymentActivity {
void debitPayment(OrderDTO orderDTO);
}
```
3. Workflow activity implementation example:
```
public class DebitPaymentActivityImpl
implements DebitPaymentActivity {
. . .
}
```
4. Workflow definition declaration example
```
@WorkflowInterface
public interface OrderFulfillmentWorkflow {
@WorkflowMethod
void createOrder(OrderDTO orderDTO);
}
```

B.2 Discussion

With attention now to FIG. 1, details are provided concerning an example embodiment, including an architecture 100 and corresponding method, of the invention. In an embodiment, the architecture 100 may be implemented in, or comprise, a multi cloud service orchestration platform that may communicate with one or more cloud environments. In general, the platform may provide orchestration services for workflows running in the cloud environments. The platform may be hosted in one of the cloud environments, or in a dedicated environment separate from the cloud environments.

As shown, the architecture 100 may comprise an authentication/authorization module 102, an orchestration module 104, a workflow service 106, a certificate authority 108, a workflow subsystem 110, a workflow registry 112, and one or more activity containers 114 that may run one or more workflows 114*a*. As well, the architecture 100 may be operable to communicate with developers/vendors 116 which may or may not be internal to the platform, and to communicate with external clients 118.

Initially, an internal developer, or a vendor, may generate a workflow package that includes a definition for a workflow that is needed to be performed. In general, a workflow definition divides long management procedures into smaller tasks and activities, orchestrating the execution of the tasks and activities by events. As shown in FIG. 1, the workflow package may comprise, but is not limited to, a workflow definition, workflow implementation details, activities definitions, and activities implementation details.

Then, the developer or vendor, as applicable, can digitally sign (1) the workflow package, such as with a public key for example. The certificate authority 108 may then review, and validate (2), possibly using a private key that corresponds to the public key, the digitally signed workflow package. The validation (2) may include, for example, reviewing the workflow definitions and activities definitions included in the workflow package to ensure there are no security or integrity concerns presented or implicated by those various definitions. The workflow subsystem 110 may then obtain the signed workflow package, and the validation information generated by the certificate authority 108. The signed workflow package and the validation information may then be stored in the workflow registry 112 by the workflow subsystem 110.

At some point, a client 118 may wish to run the workflow that was generated by the developer or vendor 116. Accordingly, the client may submit a request for workflow execution. The request may be received by the authentication/authorization module 102 which may then perform an authentication/authorization process (4) regarding the requesting client 118. Upon successful completion of the authentication/authorization process (4), an orchestration process may be invoked (5).

As part of the orchestration process, which may be performed by the orchestration module 104, the workflow requested by the client 118 may be invoked (6). After the workflow has been invoked (6), the workflow service 106 may communicate with the certificate authority 108 to (7) validate the workflow definition and, if the validation is concluded successfully, initialize execution of the validated workflow in the activity container 114.

Note that the activity container 114 may only run a workflow that has been signed and validated, as outlined above. Thus, the validation and signing processes may help to ensure the security and integrity of the activity container, and more generally, the platform, when the workflow is run. Moreover, the security context of the client, and the workflow parameters, both of which may be provided to the workflow, may both be immutable. As a result, no changes can be made by the activity container 114, or other entity, to the security context or the workflow parameters while the workflow is executing. Thus, the integrity, and maintenance, of the workflow may be maintained during execution.

C. Further Discussion

As is apparent from this disclosure, example embodiments of the invention may comprise various useful features and aspects. For example, an embodiment may create and use a secure workflow execution runtime based on Zero Trust Principles. This runtime may comprise attributes such as, but not limited to: [1] digital signing of workflow and activities definition and implementation; [2] saving only validated and review approved workflows into a workflow registry; and [3] executing only validated and approved workflows.

As another example, an embodiment may manage security context and workflow parameters by trusted workflow activity execution container and security service code. Further, an embodiment may employ a trusted activity execution container that may make immutable security context data and workflow parameters available to workflow activities.

In contrast with an example embodiment of the invention, some conventional approaches do not provide front-end signing and validation of workflows and, instead, impose those functions on the workflow execution platform. This approach complicates the structure and operation of the workflow execution platform, and may slow the orchestration process since there is no assurance initially as to the integrity and trustworthiness of a workflow requested by a client. On the other hand, an embodiment of the invention may apply the Zero Trust principles to protect the integrity and trustworthiness of a multi cloud orchestration platform and workflow execution runtime by providing for digital signing of the workflow definition and implementation, and digital signing of the workflow parameters, and an embodiment may provide the client security context data and workflow parameters through a trusted execution container, such as an activity container, as immutable data to workflow activities.

D. Example Methods

It is noted with respect to the disclosed methods, including the example method of FIG. 1, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

E. Further Example Embodiments

Following are some further example embodiments of the invention. These are presented only by way of example and are not intended to limit the scope of the invention in any way.

Embodiment 1. A method, comprising: receiving, at a multi cloud service orchestration platform from a client, a request for performance of a workflow; authenticating and authorizing the client; invoking orchestration of the workflow; invoking the workflow; validating a workflow definition associated with the workflow, and on successful validation, initializing execution of the workflow; and executing, at an activity container, the workflow.

Embodiment 2. The method as recited in any preceding embodiment, wherein the workflow corresponds to a workflow definition included in a digitally signed workflow package that also comprises a workflow implementation, an activity definition, and an activity implementation.

Embodiment 3. The method as recited in any preceding embodiment, wherein the workflow resides in a workflow registry prior to execution.

Embodiment 4. The method as recited in any preceding embodiment, wherein the activity container executes only digitally signed workflows.

Embodiment 5. The method as recited in any preceding embodiment, wherein the workflow is executed in the activity container according to immutable workflow parameters, and a security context, that are immutable and cannot be modified by the activity container while the workflow is executing.

Embodiment 6. The method as recited in any preceding embodiment, wherein the validating of the workflow definition, and the initializing of the execution of the workflow, are performed by a workflow service.

Embodiment 7. The method as recited in any preceding embodiment, wherein a digitally signed workflow package that comprises the workflow definition, as well as a workflow implementation, an activity definition, and an activity implementation, is validated and reviewed by a certificate authority.

Embodiment 8. The method as recited in any preceding embodiment, wherein a digitally signed workflow package that comprises the workflow definition, as well as a workflow implementation, an activity definition, and an activity implementation, is stored, prior to execution of the workflow, in a workflow registry by a workflow subsystem.

Embodiment 9. The method as recited in any preceding embodiment, wherein the workflow is executed in the activity container according to immutable workflow parameters that have been digitally signed.

Embodiment 10. The method as recited in any preceding embodiment, wherein client security context data and workflow parameters are available to the workflow on a read-only basis.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 2:
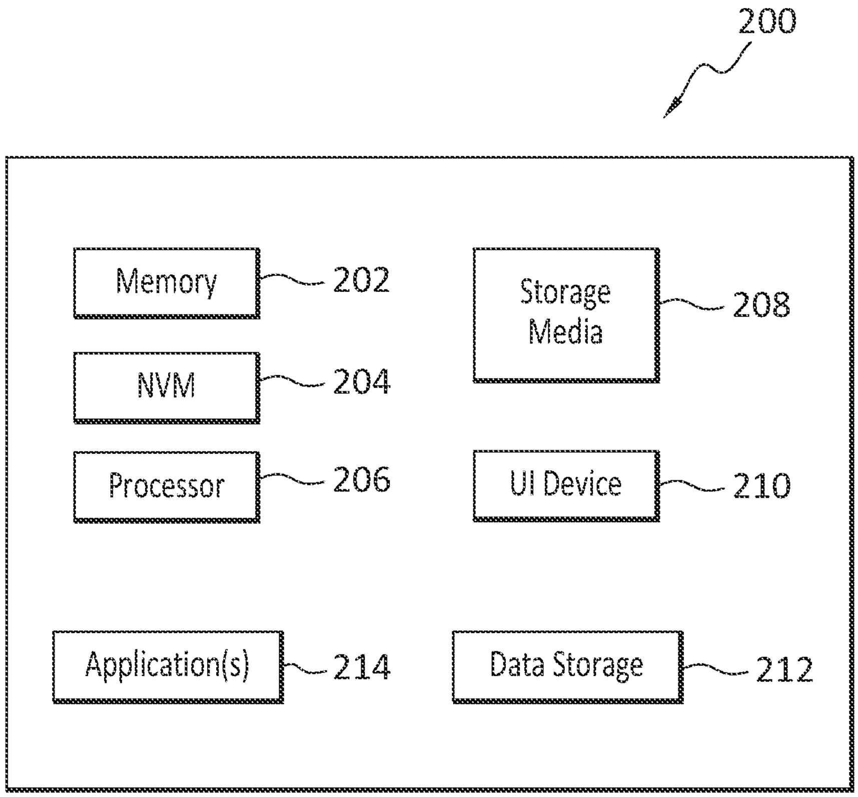
FIG. 2 discloses aspects of a computing entity operable to perform any of the disclosed methods, processes, and operations.

With reference briefly now to FIG. 2, any one or more of the entities disclosed, or implied, by FIG. 1, and/or elsewhere herein, may take the form of, or include, or be implemented on, or hosted by, a physical computing device, one example of which is denoted at 200. As well, where any of the aforementioned elements comprise or consist of a virtual machine (VM), that VM may constitute a virtualization of any combination of the physical components disclosed in FIG. 2.

In the example of FIG. 2, the physical computing device 200 includes a memory 202 which may include one, some, or all, of random access memory (RAM), non-volatile memory (NVM) 204 such as NVRAM for example, read-only memory (ROM), and persistent memory, one or more hardware processors 206, non-transitory storage media 208, UI device 210, and data storage 212. One or more of the memory components 202 of the physical computing device 200 may take the form of solid state device (SSD) storage. As well, one or more applications 214 may be provided that comprise instructions executable by one or more hardware processors 206 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

receiving, at a multi cloud service orchestration platform from a client, a request for performance of a workflow;

authenticating and authorizing the client;

invoking orchestration of the workflow;

invoking the workflow;

digitally signing, by a trusted certificate authority, a workflow definition and an activity definition associated with the workflow, wherein the workflow corresponds to the workflow definition included in a digitally signed workflow package that comprises a workflow implementation, an activity definition, and an activity implementation;

digitally signing, by the multi cloud service orchestration platform, workflow parameters associated with the workflow;

validating the workflow definition and the activity definition associated with the workflow, and on successful validation, initializing execution of the workflow; and executing, at an activity container, the workflow, wherein the digitally signed workflow package is stored prior to execution of the workflow in a workflow registry, wherein the activity container executes only workflows that have been digitally signed and validated, and wherein security context data and the workflow parameters are immutable by the activity container while the workflow is executing.

2. The method as recited in claim 1, wherein the workflow resides in the workflow registry prior to execution.

3. The method as recited in claim 1, wherein the validating of the workflow definition and initializing of the execution of the workflow are performed by a workflow service.

4. The method as recited in claim 1, wherein the digitally signed workflow package that comprises the workflow definition, the workflow implementation, the activity definition, and the activity implementation, is validated and reviewed by the trusted certificate authority.

5. The method as recited in claim 1, wherein the workflow is executed in the activity container according to the workflow parameters that have been digitally signed and immutable.

6. The method as recited in claim 1, wherein client security context data and the workflow parameters are available to the workflow on a read-only basis.

7. A non-transitory storage medium having stored therein instructions that are executable by one or more hardware processors to perform operations comprising:

receiving, at a multi cloud service orchestration platform from a client, a request for performance of a workflow;

authenticating and authorizing the client;

invoking orchestration of the workflow;

invoking the workflow; digitally signing, by a trusted certificate authority, a workflow definition and an activity definition associated with the workflow, wherein the workflow corresponds to the workflow definition included in a digitally signed workflow package that comprises a workflow implementation, an activity definition, and an activity implementation;

digitally signing, by the multi cloud service orchestration platform, workflow parameters associated with the workflow;

validating the workflow definition and the activity definition associated with the workflow, and on successful validation, initializing execution of the workflow; and executing, at an activity container, the workflow, wherein the digitally signed workflow package is stored prior to execution of the workflow in a workflow registry, wherein the activity container executes only workflows that have been digitally signed and validated, and wherein security context data and the workflow parameters are immutable by the activity container while the workflow is executing.

8. The non-transitory storage medium as recited in claim 7, wherein the workflow resides in the workflow registry prior to execution.

9. The non-transitory storage medium as recited in claim 7, wherein the validating of the workflow definition and initializing of the execution of the workflow are performed by a workflow service.

10. The non-transitory storage medium as recited in claim 7, wherein the digitally signed workflow package that comprises the workflow definition, the workflow implementation, the activity definition, and the activity implementation, is validated and reviewed by a certificate authority.

11. The non-transitory storage medium as recited in claim 7, wherein the workflow is executed in the activity container according to the workflow parameters that have been digitally signed and immutable.

12. The non-transitory storage medium as recited in claim 7, wherein client security context data and the workflow parameters are available to the workflow on a read-only basis.

* * * * *